Figure 1:
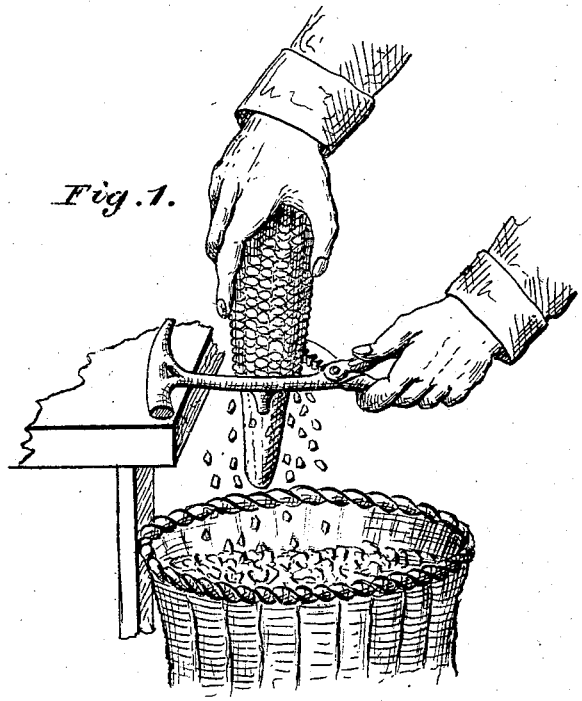
Figure 2:
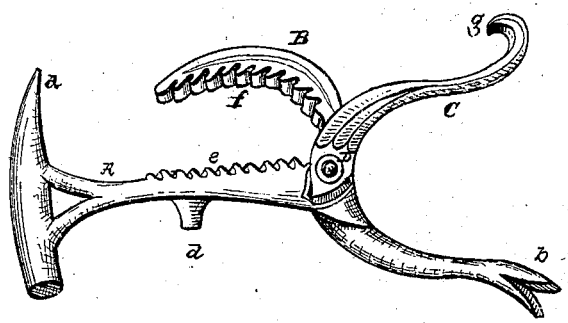

A. ISKE.

Compound Implements.

No. 136,601. Patented March 11, 1873.

Witnesses.

Inventor.

Anthony Iske

UNITED STATES PATENT OFFICE.

ANTHONY ISKE, OF LANCASTER, PENNSYLVANIA.

IMPROVEMENT IN COMPOUND IMPLEMENTS.

Specification forming part of Letters Patent No. 136,601, dated March 11, 1873.

*To all whom it may concern:*

Be it known that I, ANTHONY ISKE, of the city of Lancaster, in the county of Lancaster and State of Pennsylvania, have invented a certain Compound Implement, consisting of a Hand Corn-Sheller, Boot-Jack, Hammer, &c., of which the following is a specification:

The nature of my invention consists of three parts, united by a single rivet-joint, constituting a hand corn-sheller, boot-jack, hammer, hook-claw, tack-drawer, and pot-lifter, besides being useful as a wrench for certain purposes.

The drawing clearly shows its construction and combination.

The portion A has a hammer, $a$, at one end, and a fulcrum or rest, $d$, on the under side. The stem or leg of the hammer is slightly curved, and provided with teeth $e$ on one side. The portion B is S-shaped; the curved portion $f$ above is also toothed, facing the teeth on the stem of A, the lower portion $b$ being formed for drawing out tacks or lifting off stove-lids. The portion C is terminated with a hook, $g$, which adapts it to various purposes. These three parts are so united by a pivot, D, as to constitute the combined implement shown in the drawing.

As a hand corn-sheller it will prove of superior utility. The ends $b\ g$ are held in one hand, the ear of corn introduced between the toothed portions $e\ f$, when the hammer end is laid on the edge of a table, and the ear of corn held vertically, and with a downward motion and quick turn of the wrist the corn can be shelled. When laid upon the floor, the ends $b\ g$ spread open, and one foot put on the hammer end $a$, the leg or fulcrum $d$ raises the ends up so as to form a first-rate boot-jack.

The hammer, hook, and tack-drawer are simply additional features, which are common. As a whole it can be cast of malleable iron, and hardened. A recess for cracking nuts can be added to it.

What I claim as my invention, and desire to secure by Letters Patent, is—

A compound implement consisting of a hand corn-sheller, boot-jack, hammer, and its appendages, formed by the combination of the parts A B C and pivot D, all constructed substantially in the manner and for the purposes specified and shown.

ANTHONY ISKE.

Witnesses:
WM. B. WILEY,
JACOB STAUFFER.